United States Patent [19]
Kisiel

[11] Patent Number: 5,568,908
[45] Date of Patent: Oct. 29, 1996

[54] SIX-WAY MANUAL SEAT ADJUSTMENT ASSEMBLY

[75] Inventor: Peter Kisiel, Richmond Hill, Canada

[73] Assignee: Atoma International Inc., Newmarket, Canada

[21] Appl. No.: 341,222

[22] Filed: Dec. 2, 1994

[51] Int. Cl.⁶ .................................................. F16M 13/00
[52] U.S. Cl. .................... 248/419; 248/422; 248/429; 248/394; 248/396
[58] Field of Search .................................. 248/394, 396, 248/398, 419, 420, 421, 422, 429

[56] References Cited

U.S. PATENT DOCUMENTS

| | | | |
|---|---|---|---|
| 3,692,271 | 9/1972 | Homier et al. | 248/394 |
| 4,190,225 | 2/1980 | Bauer et al. | 248/394 |
| 4,222,543 | 9/1980 | Gedig et al. | 248/394 |
| 4,325,527 | 4/1982 | Berneking | 248/394 |
| 4,530,481 | 7/1985 | Klüting et al. | 248/394 |
| 4,616,875 | 10/1986 | McFalls et al. | 248/394 |
| 4,721,277 | 1/1988 | Hessler et al. | 248/396 X |
| 4,747,571 | 5/1988 | Hessler et al. | 248/394 |
| 4,765,582 | 8/1988 | Babbs | 248/394 |
| 4,770,386 | 9/1988 | Hessler et al. | 248/394 X |
| 5,199,679 | 4/1993 | Nakamura et al. | 248/394 |
| 5,207,480 | 5/1993 | Johnson et al. | 297/344.1 |

FOREIGN PATENT DOCUMENTS 2409579  9/1975  Germany .................. 248/396

Primary Examiner—Alvin C. Chin-Shue
Assistant Examiner—Brian J. Hamilla
Attorney, Agent, or Firm—Cushman Darby & Cushman

[57] ABSTRACT

An improved manually adjustable vehicle seat assembly is disclosed. The adjustable vehicle seat assembly includes a vehicle seat, track assemblies each with a stationary track fixed to a vehicle floor and a translating track slidably interconnected with the stationary track, a horizontal adjustment mechanism that provides an occupant of the seat with the ability to position the translating tracks horizontally relative to the stationary tracks, a seat support structure, including forward and rearward seat support arm assemblies, for supporting the seat on the translating tracks, and a vertical adjustment mechanism having forward and rearward sector gears coupled with the forward and rearward seat support arm assemblies respectively, forward and rearward locking members mounted so as to be selectively engageable with the corresponding sector gear to prevent movement of the sector gear, and seat support arm assembly coupled thereto, when engaged, forward and rearward camming members mounted so as to be selectively moved to either engage or disengage the corresponding locking member, a resilient coupling between the camming members, a lever actuated control member, an actuating lever, and a fore and aft motion transmitting member coupled with the lever actuated control member and the camming members by pin and slot connections so that upon movement of the lever actuated control member one camming member is moved so as to disengage a corresponding locking member while the other camming member continues to hold the corresponding locking member in the engaged position.

20 Claims, 5 Drawing Sheets

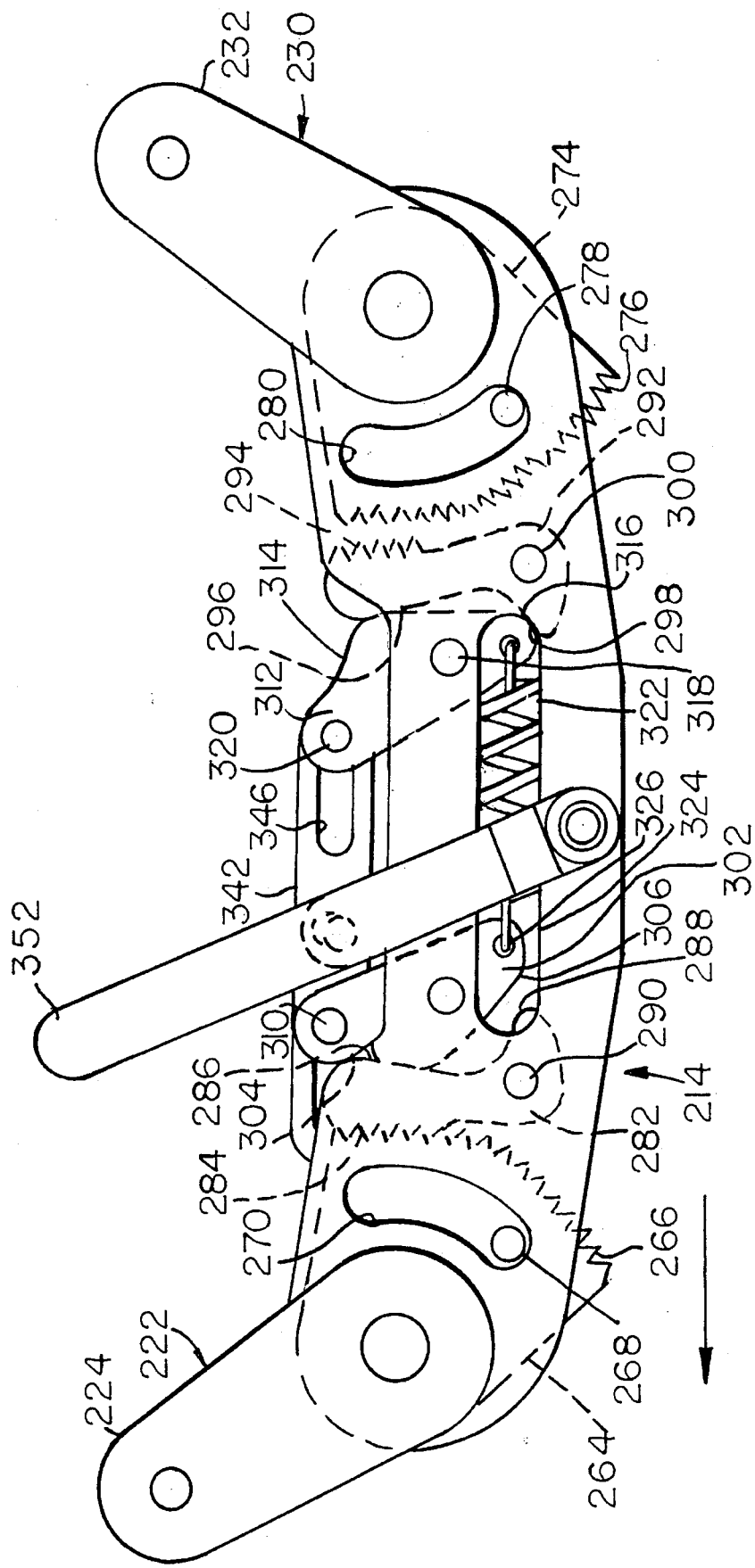

SIX-WAY MANUAL SEAT ADJUSTMENT ASSEMBLY

BACKGROUND OF THE INVENTION

1. Field of the Invention

This invention relates to a mechanism that enables an occupant of a vehicle seat to manually adjust the vertical and the fore and aft positions of the seat.

2. Description of the Related Art

Traditionally, vertical seat adjustment capability in automobiles was reserved for expensive luxury vehicles. Recently, however, in response to increased consumer demands, many automobile manufacturers have begun providing, in smaller economy cars, vehicle seats that are adjustable in the vertical as well as the fore and aft direction. One problem encountered in providing such a feature is that the increased weight, complexity, and expense of conventional powered seat adjustment systems have made such devices impractical for use in smaller, less-expensive cars. Thus, automobile manufacturers have turned to compact, manually operated, and mechanically simple seat adjustment mechanisms for economy cars.

The manual, six-way seat adjuster, providing fore and aft horizontal adjustment capabilities, and independent height adjustment capabilities for the forward and rearward portions of the seat cushion, is well known in the art. Typically, one or more adjusting levers are provided for the occupant of the seat to manipulate to allow manual adjustment of the seat to a desired position. While six-way seat adjusters are well known, there nevertheless remains the constant need and challenge to improve the reliability of the manual six-way seat adjuster while at the same time reducing the number of parts required and simplifying the construction and operation of such devices.

SUMMARY OF THE INVENTION

It is an object of the present invention to provide a six-way manual seat adjustment mechanism that meets the aforementioned needs and challenges. Specifically, a manually adjustable vehicle seat assembly is provided which includes a seat, including a seat cushion assembly having forward and rearward portions constructed and arranged to support an occupant sitting thereon and a seat back assembly constructed and arranged to support the back of an occupant sitting on the seat cushion assembly. Furthermore, there is provided a pair of track assemblies disposed in a spaced parallel arrangement, each track assembly includes a stationary track fixed to a vehicle floor and a translating track slidably interconnected with the stationary track. A horizontal adjustment mechanism is provided that is constructed and arranged with respect to the track assemblies to provide an occupant of the seat with the ability to position the translating tracks in a selected one of a multiplicity of different horizontal positions with respect to the stationary tracks.

Forward and rearward seat support arm assemblies, constructed and arranged to support the forward and rearward portions, respectively, of the seat cushion assembly in a selected one of a multiplicity of vertical positions, are provided. In addition there is provided, a mounting structure constructed and arranged to support the forward and rearward seat support arm assemblies and the seat supported thereon on the translating tracks to allow the horizontal positioning of the translating tracks to horizontally position the seat. The rearward seat support assembly includes a biasing system operatively coupled therewith and constructed and arranged to urge the rearward seat support arm assembly and the rearward portion of the seat cushion assembly into an upward position.

Finally, there is provided a vertical adjusting mechanism, constructed and arranged to allow either of said seat support arm assemblies to be moved into a selected vertical position and to be retained thereat. The vertical adjusting mechanism includes forward and rearward sector gears having a plurality of locking projections operatively coupled with the forward and rearward seat support arm assemblies respectively and moveable with the forward and rearward seat support arm assemblies as the forward or rearward portion of the seat cushion assembly is positioned in the selected one of a multiplicity of vertical positions.

Forward and rearward locking members are provided, each having locking teeth, an engaging surface, and a disengaging surface. Each locking member is mounted with respect to the mounting structure for movement between: (1) an engaged position wherein the locking teeth of the locking member are engaged with the locking projections of the corresponding sector gear, thereby preventing movement of the sector gear, the corresponding seat support arm assembly, and the corresponding forward or rearward portion of the seat cushion assembly, and (2) a disengaged position wherein the locking teeth of the locking member are disengaged from the locking projections of the corresponding sector gear, thereby releasing the sector gear, the corresponding seat support arm assembly, and the corresponding forward or rearward portion of the seat cushion assembly for movement of the portion of the seat cushion assembly into the selected one of a multiplicity of vertical positions.

Next are provided forward and rearward camming members each having a locking surface and a camming surface. Each forward and rearward camming member is mounted with respect to the mounting structure for movement between: (1) a locked position wherein the locking surface of the camming member is engaged with the engaging surface of the corresponding forward or rearward locking member so as to urge the locking member into its engaged position, and (2) a released position wherein the camming surface of the camming member is engaged with the disengaging surface of the corresponding forward or rearward locking member so as to urge the locking member into its disengaged position.

A resilient coupling is provided between the forward and rearward camming members which is constructed and arranged to urge the forward and rearward camming members into their engaged positions.

A lever actuated control member is provided which is mounted with respect to the mounting structure for movement between a centered position and either (1) a fully forward position or (2) a fully rearward position. Furthermore, an actuating lever is provided which is constructed and arranged to enable an occupant of the seat to move the lever actuated control member from the centered position into a selected one of the fully forward position and the fully rearward position. Finally, the vertical adjusting mechanism includes a fore and aft motion transmitting member coupled at an intermediate portion thereof with the lever actuated control member and at opposite ends thereof with the forward and rearward camming members by pin and slot connections.

When the lever actuated control member is moved from the centered position to its fully forward position the pin and slot connection with the rearward camming member causes the same to move against the urging of the resilient coupling from the locked position thereof into the released position thereof while the pin and slot connection with the forward camming member allows the same to remain in the locked position thereof. When the lever actuated control member is moved from the centered position to its fully rearward position the pin and slot connection with the forward camming member causes the same to move against the urging of the resilient coupling from the locked position thereof into the released position thereof while the pin and slot connection with the rearward camming member allows the same to remain in the locked position thereof.

It is another object of the invention to provide a vertical adjustment mechanism requiring a minimum number of parts and having simple construction. The vertical adjustment mechanism of the present invention satisfies this object by providing a construction that is symmetric about a vertical plane that is transverse to the fore and aft direction. The components employed and the assembly required in the foreword portion of the vertical adjustment mechanism of the present invention are identical to the components employed and the assembly required in the rearward portion of the device.

DESCRIPTION OF THE DRAWINGS

FIG. 5 is an elevational view of a vertical adjustment mechanism according to the present invention with the actuating lever in a fully forward position.

DETAILED DESCRIPTION OF THE PREFERRED EMBODIMENT

Figure 1:
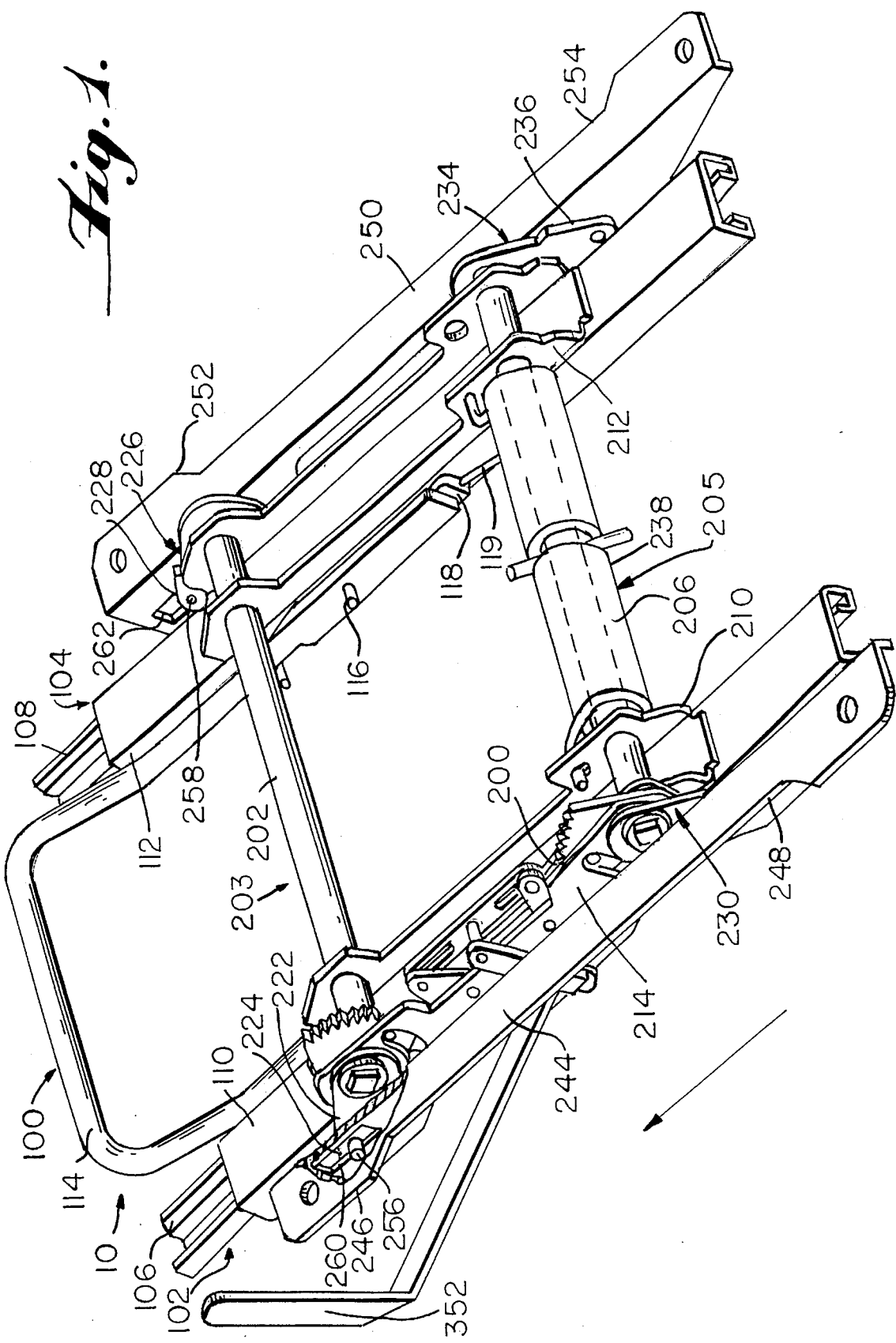
FIG. 1 is perspective view with partial cutout of a manual six way seat adjustment assembly illustrating a preferred embodiment of the present invention.

A preferred embodiment of the six-way manually adjustable vehicle seat assembly 10 provided in accordance with the present invention is shown in FIG. 1. The adjustable seat assembly 10 includes a vehicle seat shown in phantom in FIG. 3 which includes a seat cushion and a back rest.

The adjustable seat assembly 10 further includes left and right track assemblies 102, 104. The track assemblies include elongated stationary tracks 106, 108 that are fixedly mounted on a vehicle floor (not shown), and elongated translating tracks 110, 112 that are slidably interconnected with the stationary tracks 106, 108. A horizontal adjustment mechanism 100 is provided to allow an occupant of the seat to selectively position the translating tracks 110, 112 in one of a multiplicity of horizontal positions relative to the stationary tracks 106, 108. The horizontal adjustment mechanism includes an apparatus, such as an adjusting bail 114, which is pivotally mounted on pins 116 (right side only shown) to the translating tracks 110, 112 and with which an occupant can selectively disengage locking mechanisms 118 (right side only shown) by lifting the adjusting bail 114. With the locking mechanisms 118 disengaged, the translating tracks 110, 112 are slidable relative to the stationary tracks 106, 108, and the occupant of the seat may manually position the seat, which is fixed to the translating tracks in a manner to be described below, in a selected one of a multiplicity of different horizontal positions in a fore and aft direction. Upon release of the adjusting bail 114, biasing members 119 (right side only shown) within the locking mechanisms 118 will urge the locking mechanisms back into a locked position. A mechanism such as that disclosed in U.S. Pat. No. 4,733,845 exemplifies a suitable horizontal adjustment mechanism for use with the present invention.

Next are provided forward and rearward seat support arm assemblies 203, 205, each including a forward torsion rod 202 and a rearward torsion rod 206, respectively. As shown in FIG. 1, mounted on opposite ends of the forward torsion rod 202 are left and right forward seat support arms 222, 226. The forward seat support arms 222, 226 are fixedly mounted to the forward torsion rod 202 so as to be rotatable along with the forward rod 202, the left forward seat support arm 222 being a slave of the right forward seat support arm 226, and vice versa. Forward seat support arm 222 is held on torsion rod 202 by nut 240.

Mounted on opposite ends of the rearward torsion rod 206 are left and right rearward seat support arms 230, 234. The rearward seat support arms 230, 234 are fixedly mounted to the rearward torsion rod 206 so as to be rotatable with the rearward rod 206, the left rearward seat support arm 230 being a slave of the right rearward seat support arm 234, and vice versa. Rearward seat support art 230 is held on torsion rod 206 by nut 242. In addition, as shown in FIG. 1, the rearward torsion rod is operatively coupled with a biasing system 238 which urges the rearward torsion rod 206 to rotate in such a manner as to rotate the rearward seat support arms 230, 234 into an upward position.

Left and right seat cushion mounting members 244, 250 are provided for securing the vehicle seat to the six-way seat adjustment assembly 10. The end portions 224, 228 of the left and right forward seat support arms 222, 226 are pivotally coupled with the forward portions 246, 252 of the left and right seat cushion mounting members 244, 250 respectfully. The forward seat support arms 222, 226 are coupled with the seat cushion mounting members 244, 250 by means of pins 256, 258 extending from the forward pivoting seat support arms 222, 226 and into longitudinal slots 260, 262 (see FIG. 1) in the forward portions 246, 252 of the seat cushion mounting members 244, 250, thus effecting a lost motion coupling. Also, the end portions 232 (see FIG. 2), 236 of the left and right rearward seat support arms 230, 234 are pivotally attached to the rearward portions 248, 254 of the left and right seat cushion mounting member 244, 250 respectively. The seat, including the seat cushion and the seat back, is mounted to the seat cushion mounting members 244, 250 by any suitable means such as bolts or rivets.

A mounting structure is provided, which includes a left and right rod mounting members 210, 212 and a component mounting structure 214. The torsion rods 202, 206 are journally supported in a parallel arrangement by the left and right rod mounting members 210, 212. Furthermore, the left and right rod mounting members support the forward and rearward seat support arm assemblies 203, 205 and the seat supported thereon on the translating tracks 110, 112 to allow the seat and the translating tracks to be positioned horizontally relative to the stationary tracks, 106, 108. The seat support arm assemblies are fixed to the translating tracks by any suitable means such as bolts, rivets, welds, or the like. In this manner, the vehicle seat is also secured to the vehicle floor.

As also shown in FIG. 1, a vertical adjustment mechanism 200 is also provided. The vertical adjustment mechanism 200 allows the occupant of the seat to independently position either the forward or rearward seat support assemblies 203,205 into a selected one of a multiplicity of vertical positions and then retain the seat support assembly thereat.

Figure 2:
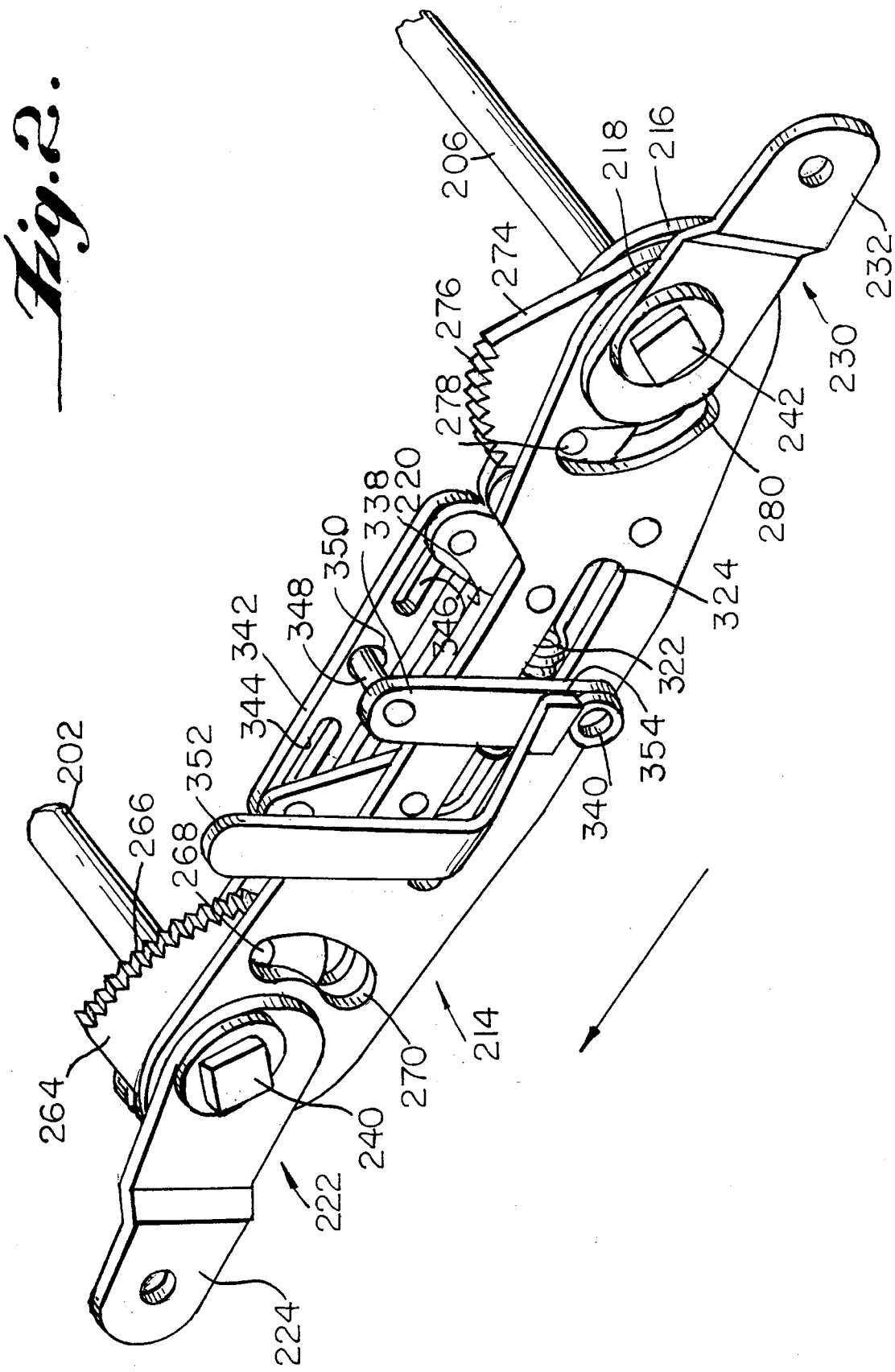
FIG. 2 is a perspective view of a preferred embodiment of a vertical adjustment mechanism according to the present invention.

The vertical adjustment mechanism 200 includes the component mounting structure 214 that is arranged adjacent to and parallel with one of the track assemblies. The component mounting structure 214 is shown in FIG. 1 positioned adjacent to and parallel with the left track assembly 102, however, it will be clear to one skilled in the art that the component mounting structure may be fixed alongside the right track assembly 104 as well. As best seen in FIG. 2, the component mounting structure 214 is constructed of an inner component mounting structure plate 216 and an outer component mounting structure plate 218, disposed in a substantially parallel arrangement and defining a space 220 therebetween.

The remaining details of the vertical adjustment mechanism are best shown in FIGS. 2–5 depicting the component mounting structure 214 of the vertical seat adjustment mechanism 200 separate from the remainder of the six-way seat adjustment assembly 10.

A forward sector gear 264 having locking projections 266 along a curved portion thereof is mounted on the forward torsion rod 202 in the space 220 between the inner and outer component mounting structure plates 216, 218. The forward sector gear 264 is fixedly mounted to the forward torsion rod 202 so as to be rotatable with the rod and is oriented in such a manner that the locking projections 266 generally face rearwardly. The range of rotational motion of the forward sector gear 264, and thus of the forward torsion rod 202, is preferably restricted by means of a restraining pin 268 extending from the forward sector gear 264 and into a forward arcuate slot 270 located in the component mounting structure 214.

In a mirror construction of the forward sector gear 264, a rearward sector gear 274 having locking projections 276 along a curved portion thereof is mounted on the rearward torsion rod 206 in the space 220 between the inner and outer component mounting structure plates 216, 218. The rearward sector gear 274 is fixedly mounted to the rearward torsion rod 206 so as to be rotatable with the rod and is oriented in such a manner that the locking projections 276 generally face forwardly. The range of rotational motion of the rearward sector gear 274, and thus of the rearward torsion rod 206, is preferably restricted by means of a restraining pin 278 extending from the rearward sector gear 274 and into a rearward arcuate slot 280 located in the component mounting structure 214.

At a position toward the center of the component mounting structure 214 from the forward sector gear 264, a forward locking member 282 (see FIGS. 3–5) having locking teeth 284, an engaging surface 286, and a disengaging surface 288 is pivotally mounted on a pin 290 in the space 220 between the inner and outer component mounting structure plates 216, 218. The forward locking member 282 is pivotable between: (1) an engaged position, shown in FIGS. 3 and 5, wherein the locking teeth 284 are engaged with the locking projections 266 of the forward sector gear 264 thereby preventing rotation of the forward sector gear, the forward seat support arm assembly, and the forward portion of the seat cushion assembly, and (2) a disengaged position, shown in FIG. 4, wherein the locking teeth 284 are disengaged from the locking projections 266 of the forward sector gear 264, thereby releasing the forward sector gear 264, the forward seat support arm assembly 203, and the forward portion of the seat cushion assembly for vertical positioning of the forward portion of the seat cushion assembly.

In a mirror construction of the forward locking member 282, at a position toward the center of the component mounting structure 214 from the rearward sector gear 274, a rearward locking member 292 having locking teeth 294, an engaging surface 296, and a disengaging surface 298 is pivotally mounted on a pin 300 in the space 220 between the inner and outer component mounting structure plates 216, 218. The rearward locking member 292 is pivotable between: (1) an engaged position, shown in FIGS. 3 and 4, wherein the locking teeth 294 are engaged with the locking projections 276 of the rearward sector gear 274 thereby preventing rotation of the rearward sector gear, the rearward seat support arm assembly, and the rearward portion of the seat cushion assembly, and (2) a disengaged position, shown in FIG. 5, wherein the locking teeth 294 are disengaged from the locking projections 276 of the rearward sector gear 274, thereby releasing the rearward sector gear 274, the rearward seat support arm assembly 205, and the rearward portion of the seat cushion assembly for vertical positioning of the rearward portion of the seat cushion assembly.

At a position toward the center of the component mounting structure 214 from the forward locking member 282, a forward camming member 302 having a locking surface 304 and a camming surface 306 is pivotally mounted on a pin 308 in the space 220 between the inner and outer component mounting structure plates 216, 218. The forward camming member 302 is mounted for pivotal movement between: (1) a locked position, shown in FIGS. 3 and 5, wherein the locking surface 304 is engaged with the engaging surface 286 of the forward locking member 282 so as to urge the forward locking member into its engaged position, and (2) a released position, shown in FIG. 4, wherein the camming surface 306 is engaged with the disengaging surface 288 of the forward locking member 282 so as to urge the forward locking member into its disengaged position.

In a mirror construction of the forward camming member 302, at a position toward the center of the component mounting structure 214 from the rearward locking member 292, a rearward camming member 312, having a locking surface 314 and a camming surface 316, is pivotally mounted on a pin 318 in the space 220 between the inner and outer component mounting structure plates 216, 218. The rearward camming member 312 is mounted for pivotal movement between: (1) a locked position, shown in FIGS. 3 and 4, wherein the locking surface 314 is engaged with the engaging surface 296 of the rearward locking member 292 so as to urge the rearward locking member into its engaged position, and (2) a released position, shown in FIG. 5, wherein the camming surface 316 is engaged with the disengaging surface 298 of the rearward locking member 292 so as to urge the rearward locking member into its disengaged position.

The vertical adjustment mechanism 200 is further provided with a resilient coupling 322, such as a tension spring or the like, disposed within a horizontal slot 324 in the component mounting structure 214. Opposite ends of the resilient coupling 322 are attached to lower portions 326, 336 of the forward and rearward camming members 302, 312, so that the resilient coupling urges the forward and rearward camming members into their locked positions.

A lever actuated control member 338 (see FIG. 2) is pivotally mounted at 340 to the component mounting structure 214 generally at its center. The lever actuated control member is moveable between a centered position, see FIG. 1, and either a fully forward position, see FIG. 5, or a fully rearward position, see FIG. 4.

Figure 3:
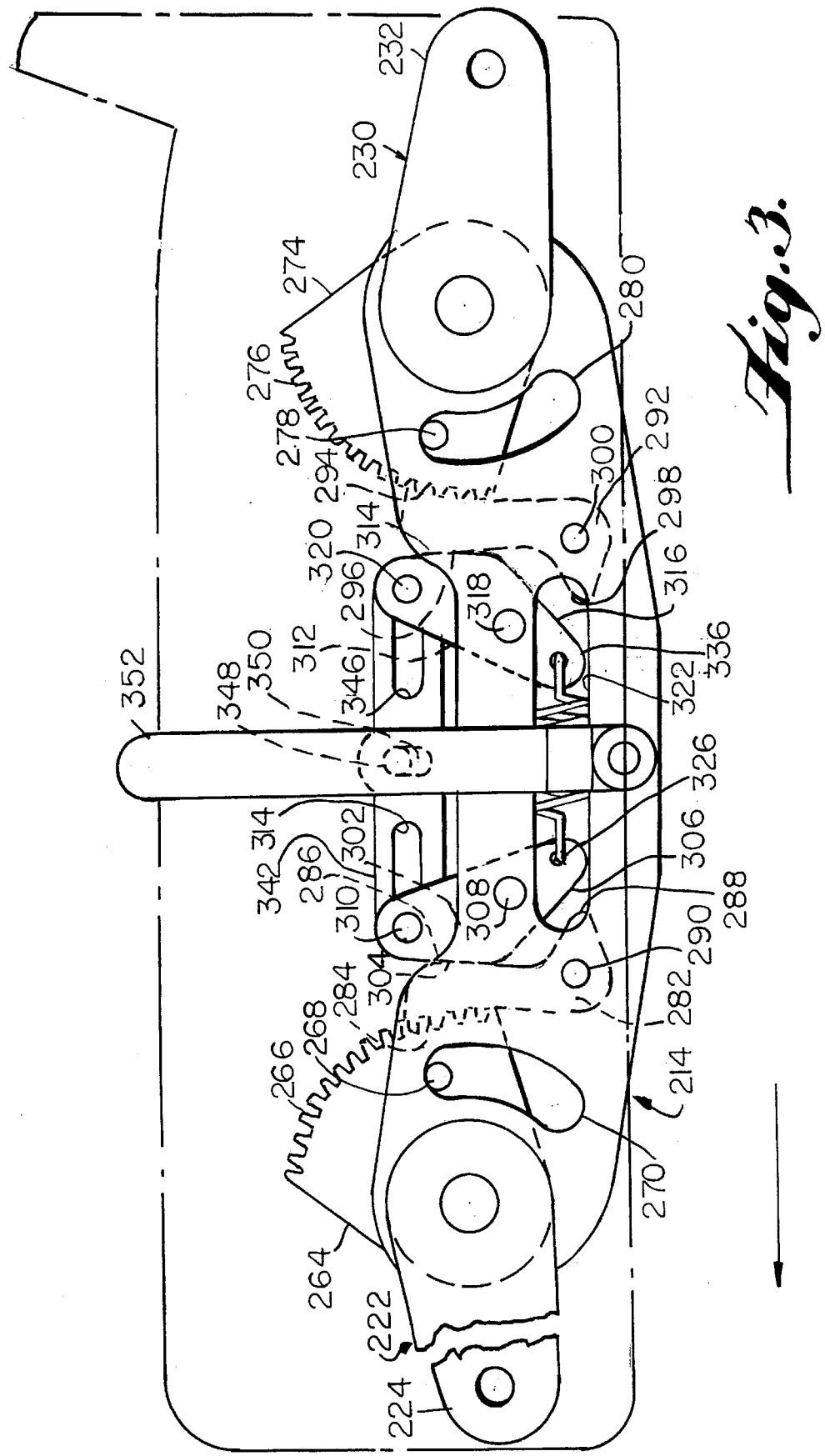
FIG. 3 is an elevational view of a vertical adjustment mechanism according to the present invention with the actuating lever in a locking position.

As can be seen in FIG. 3, the lever actuated control member 338 defines a line of symmetry about which the geometry of the components mounted to the forward portion of the component mounting structure mirrors the geometry of the components mounted to the rearward portion of the component mounting structure.

A fore and aft motion transmitting member 342 having a forward longitudinal slot 344 and a rearward longitudinal slot 346 is coupled with the lever actuated control member 338 at an end of the lever actuated control member opposite the end at which it is pivotally mounted to the component mounting structure 214. The fore and aft motion transmitting member 342 is coupled with the lever actuated control member 338 preferably by means of a lost motion coupling formed by a pin 348 extending from the lever actuated control member and into a transversely elongated hole 350 located in the fore and aft motion transmitting member 342 between the forward longitudinal slot 344 and the rearward longitudinal slot 346.

A forward camming member sliding pin 310 extending from the forward camming member 302 and into the forward longitudinal slot 344 couples the fore and aft motion transmitting member 342 with the forward camming member 302. Similarly, a rearward camming member sliding pin 320 extending from the rearward camming member 312 and into the rearward longitudinal slot 346 couples the fore and aft motion transmitting member 342 with the rearward camming member 312.

An actuating lever 352 is fixedly attached at 354 (see FIG. 2) to the lever actuated control member 338 such that the actuating lever 352 and the lever actuated control member 338 form an assembly that pivots about point 340. The actuating lever enables an occupant of the seat to move the lever actuated control member from the centered position into a selected one of the fully forward and fully rearward positions.

Operation of the vertical adjustment mechanism of the present invention will now be described with reference to FIGS. 3–5.

As shown in FIG. 3, with the actuating lever 352 in a centered or locking position, the resilient coupling 322 urges the forward and rearward camming members 302, 312 into their respective locked positions. The seat cushion is then in a fully locked position with respect to its vertical orientation.

Figure 4:
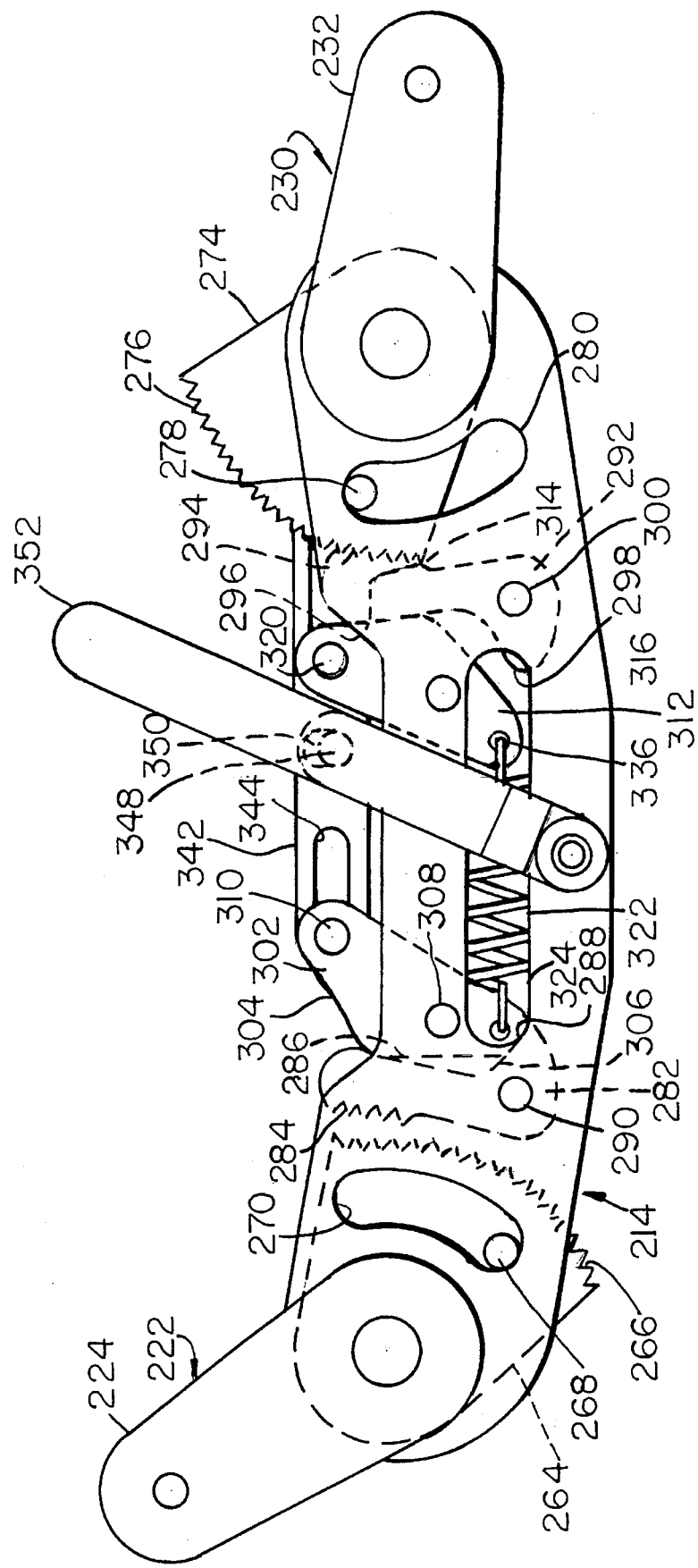
FIG. 4 is an elevational view of a vertical adjustment mechanism according to the present invention with the actuating lever in a fully rearward position.

As shown in FIG. 4, a rearward pivoting of the actuating lever 352 results in a nearly rectilinear, rearward translation of the fore and aft motion transmitting member 342. The forward camming member sliding pin 310, already at the forwardmost end of the forward longitudinal slot 344, is pulled rearward by the fore and aft motion transmitting member 342 thus pivoting the forward camming member 302 clockwise about the pin 308 from the locked position into the released position.

The rearward camming member sliding pin 320 is initially at the rearwardmost end of the rearward longitudinal slot 346. Therefor, the fore and aft motion transmitting member 342 can translate rearward without disturbing the rearward camming member from its locked position.

The occupant may then either lean forward to lower the front portion of the seat cushion or lean backward to raise the forward portion of the seat cushion, the rear portion of the seat cushion all the while remaining fixed. Upon release of the actuating lever 352, the resilient coupling 322 again urges both the forward camming member 302 and the rearward camming member 312 into their respective locked positions, and the seat is again in a fully locked position.

As shown in FIG. 5, a forward pivoting of the actuating lever 352 results in a nearly rectilinear, forward translation of the fore and aft motion transmitting member 342. The rearward camming member sliding pin 320, already at the rearwardmost end of the rearward longitudinal slot 346, is pulled forward by the fore and aft motion transmitting member 342, thus pivoting the rearward camming member 312 counterclockwise about the pin 318 from the locked position into the released position.

The forward camming member sliding pin 310 is initially at the forwardmost end of the forward longitudinal slot 344. Therefor, the fore and aft motion transmitting member 342 can translate forward without disturbing the forward camming member from its locked position.

With the rearward torsion rod 206 and rearward pivoting seat support arms 230, 234 free to rotate, the torsional biasing member 238 will urge the rearward pivoting seat support arms 230, 234 upward. The occupant need only lift his/her weight off the rear of the seat cushion to allow the rear portion of the seat cushion to rise. Alternatively, the occupant need only allow his/her weight to push down on the rear portion of the seat cushion to adjust the rear portion of the seat cushion downward. Upon release of the actuating lever 352, the resilient coupling 322 again urges both the forward camming member 302 and the rearward camming member 312 into their respective locked positions, and the seat is again in a fully locked position.

Having described the invention, it will be apparent to those skilled in the art that various modifications may be made thereto without departing from the spirit and scope of this invention as defined in the appended claims.

What is claimed is:

1. A manually adjustable vehicle seat assembly comprising:

a seat including a seat cushion assembly having forward and rearward portions constructed and arranged to support an occupant sitting thereon and a seat back assembly constructed and arranged to support the back of the occupant sitting on said seat cushion assembly;

a forward seat support arm assembly constructed and arranged to support the forward portion of the seat cushion assembly in a selected one of a multiplicity of vertical positions;

a rearward seat support arm assembly constructed and arranged to support the rearward portion of the seat cushion assembly in a selected one of a multiplicity of vertical positions;

a mounting assembly constructed and arranged to support the forward and rearward seat support arm assemblies and the seat supported thereon on a vehicle floor;

a biasing system operatively coupled with said rearward seat support arm assembly and constructed and arranged to urge the rearward seat support arm assembly and the rearward portion of the seat cushion assembly into an upward position; and a vertical adjusting mechanism, constructed and arranged to allow either of said seat support arm assemblies to be moved into a selected vertical position and to be retained thereat, said vertical adjusting mechanism comprising:

a forward sector gear having a plurality of locking projections operatively coupled with the forward seat support arm assembly and moveable with the forward seat support arm assembly as the forward portion of the seat cushion assembly is positioned in the selected one of a multiplicity of vertical positions;

a rearward sector gear having a plurality of locking projections operatively coupled with the rearward seat support arm assembly and moveable with the rearward seat support arm assembly as the rearward portion of the seat cushion assembly is positioned in the selected one of a multiplicity of vertical positions;

a forward locking member and rearward locking member each having locking teeth, an engaging surface, and a disengaging surface, the forward locking member being mounted with respect to the mounting structure for movement between (1) an engaged position wherein the locking teeth of the forward locking member are engaged with the locking projections of the forward sector gear, thereby preventing movement of the forward sector gear, the forward seat support arm assembly, and the forward portion of the seat cushion assembly and (2) a disengaged position wherein the locking teeth of the forward locking member are disengaged from the locking projections of the forward sector gear, thereby releasing the forward sector gear, the forward seat support arm assembly, and the forward portion of the seat cushion assembly for movement of the forward portion of the seat cushion assembly into the selected one of a multiplicity of vertical positions, the rearward locking member being mounted with respect to the mounting structure for movement between (1) an engaged position wherein the locking teeth of the rearward locking member are engaged with the locking projections of the rearward sector gear, thereby preventing movement of the rearward sector gear, the rearward seat support arm assembly, and the rearward portion of the seat cushion assembly and (2) a disengaged position wherein the locking teeth of the rearward locking member are disengaged from the locking projections of the rearward sector gear, thereby releasing the rearward sector gear, the rearward seat support arm assembly, and the rearward portion of the seat cushion assembly for movement of the rearward portion of the seat cushion assembly into the selected one of a multiplicity of vertical positions;

a forward camming member and a rearward camming member each having a locking surface and a camming surface, the forward camming member being mounted with respect to the mounting structure for movement between (1) a locked position wherein the locking surface of the forward camming member is engaged with the engaging surface of the forward locking member so as to urge the forward locking member into its engaged position and (2) a released position wherein the camming surface of the forward camming member is engaged with the disengaging surface of the forward locking member so as to move the forward locking member from its engaged position into its disengaged position, the rearward camming member being mounted with respect to the mounting structure for movement between (1) a locked position wherein the locking surface of the rearward camming member is engaged with the engaging surface of the rearward locking member so as to urge the rearward locking member into its engaged position and (2) a released position wherein the camming surface of the rearward camming member is engaged with the disengaging surface of the rearward locking member so as to move the rearward locking member from its engaged position into its disengaged position;

a resilient coupling between the forward and rearward camming members constructed and arranged to urge the forward and rearward camming members into their locked positions;

a lever actuated control member mounted with respect to the mounting structure for movement between a centered position and either (1) a fully forward position or (2) a fully rearward position;

an actuating lever constructed and arranged to enable the occupant of said seat to move the lever actuated control member from the centered position into a selected one of the fully forward position and the fully rearward position; and a fore and aft motion transmitting member coupled at an intermediate portion thereof with the lever actuated control member and at opposite ends thereof with said forward and rearward camming members by pin and slot connections such that (1) when the lever actuated control member is moved from the centered position to its fully forward position the pin and slot connection with the rearward camming member causes the same to move against the urging of the resilient coupling from the locked position thereof into the released position thereof while the pin and slot connection with the forward camming member allows the same to remain in the locked position thereof and (2) when the lever actuated control member is moved from the centered position to its fully rearward position the pin and slot connection with the forward camming member causes the same to move against the urging of the resilient coupling from the locked position thereof into the released position thereof while the pin and slot connection with the rearward camming member allows the same to remain in the locked position thereof.

2. The manually adjustable vehicle seat assembly of claim 1 wherein said forward and rearward seat support arm assemblies each comprise a torsion bar oriented transverse to said track assemblies and journally supported by said mounting structure and a pair of seat support arms, each fixedly attached at a first end of said seat support arm to said torsion rod proximate opposite ends thereof for rotation with said torsion rod and pivotally coupled at a second end of said seat support arm to a one of said forward and rearward portions of said seat cushion assembly.

3. The manually adjustable vehicle seat assembly of claim 2 wherein said forward seat support arm assembly is pivotally coupled with the forward portion of the seat cushion assembly by pin and slot connections.

4. The manually adjustable vehicle seat assembly of claim 3 wherein said forward and rearward sector gears are oriented so that said locking projections of said forward sector gear face said locking projections of said rearward sector gear and each said sector gear has a range of motion that is limited by a pin and arcuate slot arrangement between each said sector gear and said mounting structure.

5. The manually adjustable vehicle seat assembly of claim 4 wherein with the lever actuated control member in the centered position thereof, the orientations of the forward sector gear, the forward locking member, and the forward camming member are symmetric about a center portion of the mounting structure with the orientations of the rearward sector gear, the rearward locking member, and the rearward camming member respectively.

6. The manually adjustable vehicle seat assembly of claim 5 wherein the fore and aft motion transmitting member is coupled with the lever actuated control member by a pin and slot connection.

7. The manually adjustable vehicle seat assembly of claim 1 wherein said forward seat assembly is pivotally coupled with the forward portion of the seat cushion assembly by pin and slot connections.

8. The manually adjustable vehicle seat assembly of claim 1 wherein said forward and rearward sector gears are oriented so that said locking projections of said forward sector gear face said locking projections of said rearward sector gear and each said sector gear has a range of motion that is limited by a pin and arcuate slot arrangement between each said sector gear and said mounting structure.

9. The manually adjustable vehicle seat assembly of claim 1 wherein with the lever actuated control member in the centered position thereof, the orientations of the forward sector gear, the forward locking member, and the forward camming member are symmetric about a center portion of the mounting structure with the orientations of the rearward sector gear, the rearward locking member, and the rearward camming member respectively.

10. The manually adjustable vehicle seat assembly of claim 1 wherein the fore and aft motion transmitting member is coupled with the lever actuated control member by a pin and slot connection.

11. A manually adjustable vehicle seat assembly comprising:

a seat including a seat cushion assembly having forward and rearward portions constructed and arranged to support an occupant sitting thereon and a seat back assembly constructed and arranged to support the back of the occupant sitting on said seat cushion assembly;

a pair of track assemblies disposed in a spaced parallel arrangement, each said track assembly including a stationary track fixed to a vehicle floor and a translating track slidably interconnected with the stationary track;

a horizontal adjustment mechanism constructed and arranged with respect to said track assemblies to provide the occupant of the seat with the ability to position said translating tracks in a selected one of a multiplicity of a forward seat support arm assembly constructed and arranged to support the forward portion of the seat cushion assembly in a selected one of a multiplicity of vertical positions;

a rearward seat support arm assembly constructed and arranged to support the rearward portion of the seat cushion assembly in a selected one of a multiplicity of vertical positions;

a mounting structure constructed and arranged to support the forward and rearward seat support arm assemblies and the seat supported thereon on said translating tracks to allow the horizontal positioning thereof to horizontally position the seat;

a biasing system operatively coupled with said rearward seat support arm assembly and constructed and arranged to urge the rearward seat support arm assembly and the rearward portion of the seat cushion assembly into an upward position; and a vertical adjusting mechanism, constructed and arranged to allow either of said seat support arm assemblies to be moved into a selected vertical position and to be retained thereat, said vertical adjusting mechanism comprising:

a forward sector gear having a plurality of locking projections operatively coupled with the forward seat support arm assembly and moveable with the forward seat support arm assembly as the forward portion of the seat cushion assembly is positioned in the selected one of a multiplicity of vertical positions;

a rearward sector gear having a plurality of locking projections operatively coupled with the rearward seat support arm assembly and moveable with the rearward seat support arm assembly as the rearward portion of the seat cushion assembly is positioned in the selected one of a multiplicity of vertical positions;

a forward locking member and a rearward locking member each having locking teeth, an engaging surface, and a disengaging surface, the forward locking member being mounted with respect to the mounting structure for movement between (1) an engaged position wherein the locking teeth of the forward locking member are engaged with the locking projections of the forward sector gear, thereby preventing movement of the forward sector gear, the forward seat support arm assembly, and the forward portion of the seat cushion assembly and (2) a disengaged position wherein the locking teeth of the forward locking member are disengaged from the locking projections of the forward sector gear, thereby releasing the forward sector gear, the forward seat support arm assembly, and the forward portion of the seat cushion assembly for movement of the forward portion of the seat cushion assembly into the selected one of a multiplicity of vertical positions, the rearward locking member being mounted with respect to the mounting structure for movement between (1) an engaged position wherein the locking teeth of the rearward locking member are engaged with the locking projections of the rearward sector gear, thereby preventing movement of the rearward sector gear, the rearward seat support arm assembly, and the rearward portion of the seat cushion assembly and (2) a disengaged position wherein the locking teeth of the rearward locking member are disengaged from the locking projections of the rearward sector gear, thereby releasing the rearward sector gear, the rearward seat support arm assembly, and the rearward portion of the seat cushion assembly for movement of the rearward portion of the seat cushion assembly into the selected one of a multiplicity of vertical positions;

a forward camming member and a rearward camming member each having a locking surface and a camming surface, the forward camming member being mounted with respect to the mounting structure for movement between (1) a locked position wherein the locking surface of the forward camming member is engaged with the engaging surface of the forward locking member so as to urge the forward locking member into its engaged position and (2) a released position wherein the camming surface of the forward camming member is engaged with the disengaging surface of the forward locking member so as to move the forward locking member from its engaged position into its disengaged position, the rearward camming member being mounted with respect to the mounting structure for movement between (1) a locked position wherein the locking surface of the rearward camming member is engaged with the engaging surface of the rearward locking member so as to urge the rearward locking member into its engaged position and (2) a released position wherein the camming surface of the rearward camming member is engaged with the disengaging surface of the rearward locking member so as to move the rearward locking member from its engaged position into its disengaged position;

a resilient coupling between the forward and rearward camming members constructed and arranged to urge the forward and rearward camming members into their locked positions;

a lever actuated control member mounted with respect to the mounting structure for movement between a centered position and either (1) a fully forward position or (2) a fully rearward position;

an actuating lever constructed and arranged to enable the occupant of said seat to move the lever actuated control member from the centered position into a selected one of the fully forward position and the fully rearward position; and a fore and aft motion transmitting member coupled at an intermediate portion thereof with the lever actuated control member and at opposite ends thereof with said forward and rearward camming members by pin and slot connections such that (1) when the lever actuated control member is moved from the centered position to its fully forward position the pin and slot connection with the rearward camming member causes the same to move against the urging of the resilient coupling from the locked position thereof into the released position thereof while the pin and slot connection with the forward camming member allows the same to remain in the locked position thereof and (2) when the lever actuated control member is moved from the centered position to its fully rearward position the pin and slot connection with the forward camming member causes the same to move against the urging of the resilient coupling from the locked position thereof into the released position thereof while the pin and slot connection with the rearward camming member allows the same to remain in the locked position thereof.

12. The manually adjustable vehicle seat assembly of claim 11 wherein said forward and rearward seat support arm assemblies each comprise a torsion bar oriented transverse to said track assemblies and journally supported by said mounting structure and a pair of seat support arms, each fixedly attached at a first end of said seat support arm to said torsion rod proximate opposite ends thereof for rotation with said torsion rod and pivotally coupled at a second end of said seat support arm to a one of said forward and rearward portions of said seat cushion assembly.

13. The manually adjustable vehicle seat assembly of claim 12 wherein said forward seat support arm assembly is pivotally coupled with the forward portion of the seat cushion assembly by pin and slot connections.

14. The manually adjustable vehicle seat assembly of claim 13 wherein said forward and rearward sector gears are oriented so that said locking projections of said forward sector gear face said locking projections of said rearward sector gear and each said sector gear has a range of motion that is limited by a pin and arcuate slot arrangement between each said sector gear and said mounting structure.

15. The manually adjustable vehicle seat assembly of claim 14 wherein with the lever actuated control member in the centered position thereof, the orientations of the forward sector gear, the forward locking member, and the forward camming member are symmetric about a center portion of the mounting structure with the orientations of the rearward sector gear, the rearward locking member, and the rearward camming member respectively.

16. The manually adjustable vehicle seat assembly of claim 15 wherein the fore and aft motion transmitting member is coupled with the lever actuated control member by a pin and slot connection.

17. The manually adjustable vehicle seat assembly of claim 11 wherein said forward seat assembly is pivotally coupled with the forward portion of the seat cushion assembly by pin and slot connections.

18. The manually adjustable vehicle seat assembly of claim 11 wherein said forward and rearward sector gears are oriented so that said locking projections of said forward sector gear face said locking projections of said rearward sector gear and each said sector gear has a range of motion that is limited by a pin and arcuate slot arrangement between each said sector gear and said mounting structure.

19. The manually adjustable vehicle seat assembly of claim 11 wherein with the lever actuated control member in the centered position thereof, the orientations of the forward sector gear, the forward locking member, and the forward camming member are symmetric about a center portion of the mounting structure with the orientations of the rearward sector gear, the rearward locking member, and the rearward camming member respectively.

20. The manually adjustable vehicle seat assembly of claim 11 wherein the fore and aft motion transmitting member is coupled with the lever actuated control member by a pin and slot connection.

* * * * *